United States Patent
Ott et al.

(10) Patent No.: US 12,523,184 B2
(45) Date of Patent: Jan. 13, 2026

(54) CYLINDER DEACTIVATION EXPANDED OPERATIONAL RANGE WITH ADDITIONAL AIR SOURCE INTEGRATED WITH TURBOCHARGER

(71) Applicant: PACCAR Inc, Bellevue, WA (US)

(72) Inventors: Trevor Ott, Anacortes, WA (US); Maarten Meijer, Anacortes, WA (US); Stephen Ciatti, Bellingham, WA (US); Brandon Rouse, Anacortes, WA (US)

(73) Assignee: PACCAR Inc, Bellevue, WA (US)

( * ) Notice: Subject to any disclaimer, the term of this patent is extended or adjusted under 35 U.S.C. 154(b) by 103 days.

(21) Appl. No.: 18/635,568

(22) Filed: Apr. 15, 2024

(65) Prior Publication Data

US 2024/0254935 A1 Aug. 1, 2024

Related U.S. Application Data

(63) Continuation of application No. 17/930,892, filed on Sep. 9, 2022, now Pat. No. 11,988,163.

(51) Int. Cl.
*F02D 41/00* (2006.01)
*F02B 37/12* (2006.01)
(Continued)

(52) U.S. Cl.
CPC .......... *F02D 41/0007* (2013.01); *F02B 37/12* (2013.01); *F02B 39/10* (2013.01);
(Continued)

(58) Field of Classification Search
CPC ............. F02D 41/0007; F02D 41/0087; F02D 41/1454; F02D 41/18; F02D 2200/101; F02B 37/12; F02B 39/10; F02B 2037/122
(Continued)

(56) References Cited

U.S. PATENT DOCUMENTS 2,769,303 A * 11/1956 Lucia .................... F02B 75/22
123/561
4,165,610 A * 8/1979 Iizuka ................ F02D 41/1446
60/284
(Continued)

FOREIGN PATENT DOCUMENTS

DE 102019217562 12/2020
DE 102019217562 A1 * 12/2020 ............ B60W 10/06
(Continued)

OTHER PUBLICATIONS

International Search Report for EP Application No. 23 19 5465 mailed Jan. 9, 2024 (8 pages).

*Primary Examiner* — Phutthiwat Wongwian
*Assistant Examiner* — Brian R Kirby

(57) ABSTRACT

Providing additional mass air flow to an engine of a vehicle to expand an operating range of cylinder deactivation (CDA) is provided. Aspects of the present disclosure describe a method and system to provide additional mass air flow to an engine using an auxiliary air source coupled to a turbocharger. When a low air-to-fuel ratio state is determined in association with operating the vehicle in CDA mode, the auxiliary air source is activated to assist the turbocharger with increase the supply of supercharged intake air to the engine. Accordingly, the operating range of CDA is expanded.

20 Claims, 4 Drawing Sheets

(51) Int. Cl.
*F02B 39/10* (2006.01)
*F02D 41/14* (2006.01)
*F02D 41/18* (2006.01)

(52) U.S. Cl.
CPC ..... *F02D 41/0087* (2013.01); *F02D 41/1454* (2013.01); *F02D 41/18* (2013.01); *F02B 2037/122* (2013.01); *F02D 2200/101* (2013.01)

(58) Field of Classification Search
USPC .............................................. 123/198 F, 481
See application file for complete search history.

(56) References Cited

U.S. PATENT DOCUMENTS

| | | | | |
|---|---|---|---|---|
| 5,813,383 | A * | 9/1998 | Cummings | F02D 41/0087 123/145 A |
| 6,739,845 | B2 * | 5/2004 | Woollenweber | H02K 9/06 60/608 |
| 6,907,725 | B2 * | 6/2005 | Szymkowicz | F02D 41/0087 60/284 |
| 7,490,594 | B2 * | 2/2009 | Van Dyne | F02B 39/04 60/608 |
| 8,490,394 | B2 * | 7/2013 | Lofgren | F02B 39/04 123/561 |
| 2003/0221655 | A1 * | 12/2003 | Surnilla | F01N 13/009 123/198 F |
| 2007/0074513 | A1 * | 4/2007 | Lamb | F02B 37/013 60/605.1 |
| 2012/0017585 | A1 * | 1/2012 | Shimizu | F02B 37/18 60/602 |
| 2015/0135680 | A1 * | 5/2015 | Ancimer | F02D 13/06 60/274 |
| 2015/0345371 | A1 * | 12/2015 | Russ | F02D 23/00 123/542 |
| 2017/0159581 | A1 * | 6/2017 | McCarthy, Jr. | F02B 3/06 |
| 2017/0260916 | A1 * | 9/2017 | Kraemer | F02B 75/20 |
| 2018/0298794 | A1 | 10/2018 | McCarthy, Jr. et al. | |
| 2019/0178168 | A1 * | 6/2019 | McCarthy, Jr. | F02D 13/06 |
| 2019/0211769 | A1 * | 7/2019 | Dudar | B60K 6/24 |
| 2019/0338710 | A1 * | 11/2019 | McCarthy, Jr. | F02D 41/0087 |
| 2020/0011257 | A1 * | 1/2020 | Stretch | F02D 17/02 |

FOREIGN PATENT DOCUMENTS

| | | | |
|---|---|---|---|
| EP | 2402583 A1 | 1/2012 | |
| JP | 2005291020 A | 10/2005 | |
| WO | 2020192973 | 10/2020 | |
| WO | WO-2020192973 A1 * | 10/2020 | ........... F01N 3/2066 |

* cited by examiner

CYLINDER DEACTIVATION EXPANDED OPERATIONAL RANGE WITH ADDITIONAL AIR SOURCE INTEGRATED WITH TURBOCHARGER

CROSS-REFERENCE TO RELATED APPLICATIONS

This application is a Continuation of U.S. application Ser. No. 17/930,892 filed Sep. 9, 2022, entitled "Cylinder Deactivation Expanded Operational Range with Additional Air Source Integrated with Turborcharger," which is incorporated herein by reference in its entirety.

BACKGROUND

Diesel engines inherently face various challenges in the area of emissions. For example, in a diesel engine, fuel is injected during the compression stroke, as opposed to during the intake stroke in a spark-ignited engine. As a result, a diesel engine has less time to thoroughly mix the air and fuel before ignition. A consequence is that diesel engine exhaust contains incompletely burned fuel known as particulate matter or "soot". In addition to particulate matter, internal combustion engines, including diesel engines, produce a number of combustion products including hydrocarbons ("HC"), carbon monoxide ("CO"), nitrogen oxides ("NOX"), and sulfur oxides ("SO").

As part of efforts to reduce exhaust emissions and improve fuel economy, current technologies rely on various engine control strategies and emissions after-treatment systems (EASs). One example engine control strategy includes cylinder deactivation (CDA). CDA technology reduces the effective engine displacement of an engine by decreasing the number of active cylinders. This increases the load on the active cylinders to position the operating range of the active cylinders in an improved combustion efficiency and fuel economy range. Additionally, CDA also raises exhaust temperatures and, therefore, EAS catalyst temperatures, which can improve fuel economy at low loads and enable compliance with NOX emissions standards.

While relatively specific examples have been discussed, it should be understood that aspects of the present disclosure should not be limited to solving the specific examples identified in the background.

SUMMARY

The disclosure generally relates to extending an effective operating range of CDA by providing an auxiliary air source to increase intake combustion air flow in a diesel engine. The auxiliary air source may be integrated with a turbocharger to increase the intake combustion air flow, thus increasing the air-to-fuel ratio (AFR). For example, an electrically driven turbocharger or mechanically driven turbocharger may be used to increase the air compressed by the turbocharger in certain conditions. The increased AFT expands the range within which CDA can operate. The range, for example, may correspond with an efficiency threshold range while soot formation is at an acceptable level and various emissions levels are legally compliant.

A method is described for extending an operating range of CDA mode of a diesel engine of a vehicle, comprising: determining to activate CDA mode; sending at least one signal to deactivate at least one of a plurality of cylinders of the diesel engine; determining a target mass air flow range of intake air to the diesel engine that allows for continued CDA mode operation within an efficiency operating range; determining a mass air flow rate of the diesel engine; and when the mass air flow rate is determined to be below the target mass air flow range, sending at least one signal to cause an auxiliary air source integrated with a turbocharger to add torque to a shaft of the turbocharger in order to reach at least the target mass air flow range.

A vehicle is described, including: a diesel engine including a plurality of cylinders; a turbocharger operative to receive exhaust gas from the diesel engine and supply charged intake air to the diesel engine, the turbocharger including an auxiliary air source; at least one sensor; and an engine control unit, comprising: at least one processor; and memory coupled to the at least one processor including instructions that, when executed by the at least one processor, cause the engine control unit to: determine to activate CDA mode; send at least one signal to deactivate at least one of a plurality of cylinders of the diesel engine; determine a target mass air flow range of intake air to the diesel engine that allows for continued CDA mode operation within an efficiency operating range; determine a mass air flow rate of the diesel engine; and when the mass air flow rate is determined to be below the target mass air flow range, send at least one signal to cause the auxiliary air source to add torque to a shaft of the turbocharger in order to reach at least the target mass air flow range.

A system for extending an operating range of CDA mode is described, comprising: at least one processor; and memory coupled to the at least one processor including instructions that, when executed by the at least one processor, cause the system to: determine to activate CDA mode; send at least one signal to deactivate at least one of a plurality of cylinders of a diesel engine; determine a target mass air flow range of intake air to the diesel engine that allows for continued CDA mode operation within an efficiency operating range; determine a mass air flow rate of the diesel engine; and when the mass air flow rate is determined to be below the target mass air flow range, send at least one signal to cause an auxiliary air source integrated with a turbocharger to add torque to a shaft of the turbocharger in order to reach at least the target mass air flow range.

This summary is provided to introduce a selection of concepts in a simplified form that are further described below in the Detailed Description. This summary is not intended to identify key features or essential features of the claimed subject matter, nor is it intended to be used to limit the scope of the claimed subject matter.

BRIEF DESCRIPTION OF THE DRAWINGS

Non-limiting and non-exhaustive examples are described with reference to the following figures.

DETAILED DESCRIPTION

Figure 1:
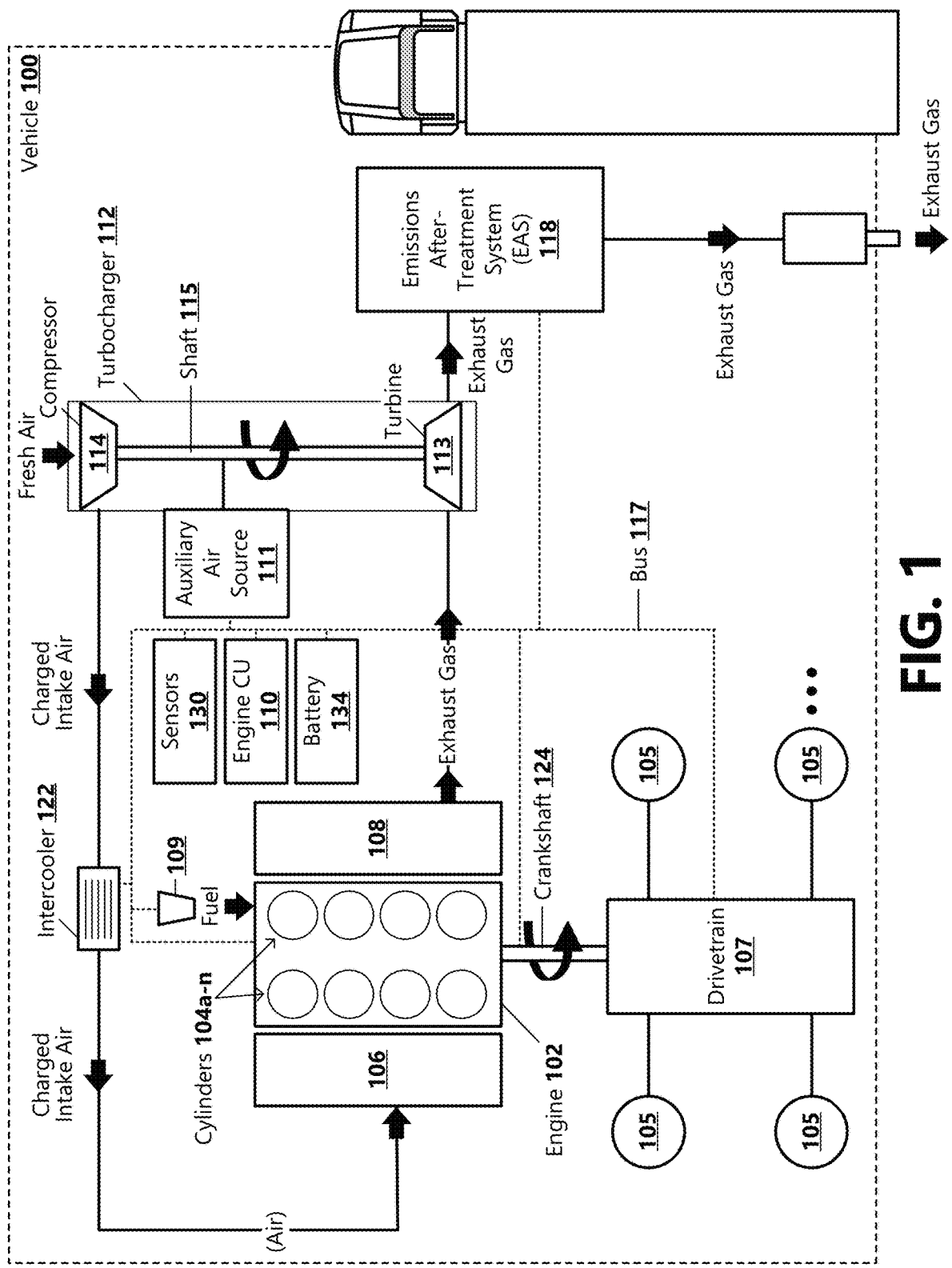
FIG. 1 is a block diagram illustrating an operating environment in which an auxiliary air source may be implemented to extend the operating range of CDA in a vehicle according to an example.

The following detailed description refers to the accompanying drawings. Wherever possible, the same reference numbers are used in the drawings and the following description to refer to the same or similar elements. While aspects of the present disclosure may be described, modifications, adaptations, and other implementations are possible. For example, substitutions, additions, or modifications may be made to the elements illustrated in the drawings, and the methods described herein may be modified by substituting, reordering, or adding stages to the disclosed methods. Accordingly, the following detailed description does not limit the present disclosure, but instead, the proper scope of the present disclosure is defined by the appended claims. The following detailed description is, therefore, not to be taken in a limiting sense.

As mentioned above, CDA is a technology that may be used to reduce exhaust emissions and improve fuel economy. However, some vehicles, such as heavy-duty engines are operated under a range of load conditions, including highway driving, urban driving, and extended idling. When operating at low engine speeds and above idle, excessive fueling and insufficient airflow can limit the range within which CDA can be used. For example, as CDA decreases the displacement of the engine, the mass air flow also decreases, which can limit the capability of a turbocharger to deliver intake combustion air to the engine. The diesel engine may be most sensitive to reduced mass air flow at low engine speeds. Typically, the diesel engine can support CDA at low engine speeds and low loads; however, above low loads at low engine speeds, the air-to-fuel ratio (AFR) may be a limiting factor of the operational range of CDA. Accordingly, aspects of the present disclosure describe a system and method for providing additional airflow to an engine using an auxiliary air source.

FIG. 1 is a block diagram illustrating an operating environment in which an auxiliary air source can be implemented for providing additional airflow to an engine according to an example. In the example shown in FIG. 1, the operating environment includes a vehicle 100, which may be a heavy-duty vehicle, with an internal combustion engine 102, a turbocharger 112 including an auxiliary air source 111, a set of at least four wheels 105 powered and driven by the engine 102, a battery 134, an emissions after-treatment system (EAS) 118, and an engine control unit (ECU) 110, which can perform operations of methods described herein to control operation of the engine 102 and to provide additional airflow to the engine 102. According to examples, the engine 102 is a diesel engine. The engine 102 generates power by burning fuel (e.g., provided by fuel injectors 109) and transmitting power to rotate a crankshaft 124. As depicted, the vehicle 100 further includes a drivetrain 107 configured to deliver power to a set of at least four wheels 105 powered and driven by rotation of the crankshaft 124. The engine 102 includes a plurality of cylinders 104a-n (collectively, cylinders 104) within which pistons reciprocate. Each piston is mechanically coupled to the crankshaft 124 by a corresponding connecting rod.

As depicted, the engine 102 includes an intake manifold 106 and an exhaust manifold 108 in communication with a plurality of combustion chambers of the engine 102 corresponding to the plurality of cylinders 104. The intake manifold 106 and the exhaust manifold 108 are connected to an exhaust gas recirculation (EGR) subsystem including the turbocharger 112 and an intercooler 122. For example, the exhaust manifold 108 releases exhaust gas from the cylinders 104 through a turbocharger turbine 113. The turbine 113 spins a shaft 115 operatively connected to the turbine 113 and a turbocharger compressor 114. Thus, the spinning shaft 115 drives the compressor 114, which compresses fresh intake air for introduction into the intake manifold 106. The air from the turbocharger may be cooled by the intercooler 122 prior to being supplied to the intake manifold 106 as intake combustion air. In some examples, after passing through the turbine 113, the exhaust gas may pass through a suitable EAS 118 for reducing combustion products (e.g., particulates, hydrocarbons ("HC"), carbon monoxide ("CO"), oxides of nitrogen ("$NO_x$"), including NO and $NO_2$, and oxides of sulfur ("$SO_x$") from the exhaust gas before it is released into the atmosphere.

In some examples, the ECU 110 causes the engine 102 to operate in a cylinder deactivation (CDA) mode, where the mass flow rate of air (sometimes hereinafter referred to as mass air flow) through the engine 102 is reduced by deactivating one or more cylinders 104 of the engine 102. For example, if the engine 104 has eight total cylinders, the mass flow rate of air through the engine 102 can be reduced by operating the engine 102 with, for example, six cylinders 104a-104f firing and two cylinders 104g, 104h deactivated. CDA reduces the effective engine displacement by decreasing the number of active cylinders 104, which increases the load on the active cylinders 104 to position the operating range of the active cylinders 104 in an improved combustion efficiency and fuel economy range. However, in some examples, the use of CDA may be restricted to certain low load conditions. The reduced mass air flow to the engine may limit the capability of the turbocharger 112 to deliver sufficient intake combustion air to the engine 102. For example, above low loads and at low speeds, the lower mass air flow to the engine 102 may cause the air-to-fuel ratio (AFR) to fall below a threshold limit (sometimes hereinafter referred to as an AFR threshold limit) for CDA. In some examples, the AFR threshold limit is defined based on stoichiometry (e.g., a balance air-to-fuel ratio for combustion). The AFR threshold limit, therefore, may bound the operating range of CDA at low engine speeds and above low engine loads.

Examples of the present disclosure provide the auxiliary air source 111 for increasing the mass air flow to the engine. Accordingly, CDA can be expanded to operate at low engine speed but above low engine load conditions (e.g., above idle). As depicted in FIG. 1, the auxiliary air source 111 may be connected to, integrated with, or otherwise attached to the turbocharger 112. According to examples, the auxiliary air source 111 is configured to help drive the turbocharger 112 when the ECU 110 makes a determination that additional mass air flow is needed, such as when reduced flow rate of air through the engine 102 reduces the AFR below the threshold limit for efficient CDA operation. For instance, below the AFR threshold limit, the exhaust gas flow rate may be insufficient to spin the turbine 113 and drive the compressor 114 for acceptable CDA operation. According to some examples, the ECU 110 may be configured to receive and monitor various sensor measurements for determining whether the mass air flow rate to the engine 102 may cause the AFR to be too low (e.g., at or below the AFR threshold limit to run CDA within a predetermined combustion efficiency and fuel economy range), which may be referred to herein as a low AFR state. When a low AFR state is sensed, the auxiliary air source 111 may be activated to further spin (e.g., add torque to) the shaft 115, further driving the compressor 114 to compress additional fresh intake air for increasing the mass air flow into the intake manifold 106 and active cylinders 104. Accordingly, the AFR is increased to enable extended CDA operation. According to examples, the auxiliary air source 111 includes a processor or is communicatively connected to a bus 117 that is connected to a processor (e.g., an ECU 110) to allow the ECU 110 to control the auxiliary air source 111. The bus 117 can comprise one or more bus standards, switches, and networks, including but not limited to Ethernet, Communications Area Network (CAN), FlexRay, I2C buses, PC Express buses, etc. For example, the bus 117 may enable vehicle components to exchange data (e.g., commands, responses, information) with each other as well as with input and/or output devices. Other mechanisms may also be used to communicatively connect the ECU 110 to the auxiliary air source 111.

The vehicle 100 may include a plurality of sensors 130 that collect and transmit data regarding operating parameters of the vehicle 100 to the ECU 110, such as continuously or periodically. For example and without limitation, the ECU 110 may receive various signals from one or more sensors 130 coupled to engine 102 (e.g., intake side and/or exhaust side), the crankshaft 124, the turbocharger 112, the auxiliary air source 111, the EAS 118, etc. One example sensor 130 includes a mass air flow sensor used to collect and transmit data regarding the mass flow rate of air entering the engine 102. Another example sensor 130 includes an exhaust gas temperature sensor used to collect and transmit data regarding the temperature of the exhaust gas leaving the engine 102 or entering or leaving the EAS 118. Another example sensor 130 includes an engine speed sensor used to collect and transmit data regarding the operating speed of the engine 102 (e.g., in rotations per minute (rpm)). Another example sensor 130 includes an air density sensor used to collect and transmit data regarding the of air (kg/l) entering the engine 102. As should be appreciated, other sensors 130 may be included and physically deployed at various places in the vehicle 100.

In some examples, the ECU 110 may be configured to determine the mass air flow rate of air entering the engine 102 and determine whether the AFR is below the AFR threshold limit for CDA operation, and thus indicative of a low AFR state. A baseline equation that can be used to characterize the methods and techniques described herein is $\dot{m} = aD \times n/60 \times VE \times \mu_{air}$, where $\dot{m}$ is the mass air flow (kg/s) of intake air, aD is the active displacement (l) of the engine 102, n is the engine speed (rpm), VE is the volumetric efficiency of the engine (%), and $\mu_{air}$ is the density of air (kg/l). In this equation, the mass air flow of air entering the engine 102 is a function of the active displacement of the cylinders 104, the engine speed, the volumetric efficiency of the engine 102, and the density of air.

According to examples, the ECU 110 may be further configured to determine an amount of additional mass air flow that may be needed for CDA operation. An example equation that can be used to characterize methods and techniques described herein to determine the amount of additional air needed to be supplied by the auxiliary air source 111 is $\dot{m}_{add} = (AFR_l \times F) - (aD \times n/60 \times VE \times \mu_{air})$, where $\dot{m}_{add}$ is the additional mass air flow (kg/s) of intake air needed to be supplied by the auxiliary air source 111, $AFR_l$ is the AFR threshold limit, and F is the fuel flow (kg) supplied to the engine 102.

When a low AFR state is determined, the ECU 110 may be further configured to determine whether to use the auxiliary air source 111 to increase the AFR. In response to determining to use the auxiliary air source 111, the ECU 110 may cause the auxiliary air source 111 to activate, thereby drawing in additional fresh air into the turbocharger 112, and thus enabling the turbocharger 112 to supply the active cylinders 104 in the engine 102 with mass air flow at a rate at which the AFR is above the AFR threshold limit for CDA operation. In some examples, the ECU 110 may be communicatively connected to the auxiliary air source 111 via the bus 117. Based on received signals and determining a low AFR state, the ECU 110 may be adapted to generate control signals that are transmitted to the auxiliary air source 111 to cause the auxiliary air source 111 to activate.

In some examples, the auxiliary air source 111 is electrically powered. For instance, the auxiliary air source 111 may include an electric motor connected to the battery 134 or to a separate battery. The auxiliary air source 111 may receive signals causing the auxiliary air source 111 to obtain electrical power from the battery 134 as power for driving the electric motor to further spin (e.g., apply torque to) the shaft 115, and thus the compressor 114, to generate the additional mass air flow ($\dot{m}_{add}$) needed for increasing the AFR and enabling CDA. In some examples, the turbocharger 112 may comprise or include an electrically assisted turbocharger, and the auxiliary air source 111 may comprise an electric motor of the electrically assisted turbocharger. In other examples, the auxiliary air source 111 may comprise one or more other mechanisms to provide an electrical power boost to the output of compressor 114.

According to examples, the vehicle 100 may be a hybrid or mild hybrid type vehicle, whereby battery energy can be regenerated into the battery 134 from non-engine sources (e.g., for example downhill coast or braking). Thus, in some examples, regenerated battery energy can be used to power the auxiliary air source 111. In other examples, the auxiliary air source 111 is mechanically powered. For instance, the auxiliary air source 111 may be configured to engage and disengage the crankshaft 124 (e.g., via a clutch, belt, gear, chain, and/or other engagement mechanism).

Based on received signals and determining a low AFR state, the ECU 110 may be adapted to generate control signals that are transmitted the auxiliary air source 111, causing the auxiliary air source 111 to engage the crankshaft 124 to drive and further spin the shaft 115, and thus the compressor 114, to generate the additional mass air flow ($\dot{m}_{add}$) needed for increasing the AFR and enabling CDA operation. In examples, the ECU 110 may calculate (and provide to the auxiliary air source 111) the additional torque to be added to the shaft 115 by the auxiliary air source 111 in order to produce the needed additional mass air flow (kg/s) $\dot{m}_{add}$. In other examples, the $\dot{m}_{add}$ is provided by the ECU 110 to the auxiliary air source 111, which itself translates the $\dot{m}_{add}$ into a torque request. In still other examples, the auxiliary air source 111 may be either on or off, but not be otherwise granularly controlled in terms of the amount of torque applied to the shaft 115.

In examples, generating additional mass air flow ($\dot{m}_{add}$) using an electrically or mechanically powered mechanism that is integrated or built into the turbocharger 112 may be advantageous in comparison to directly adding additional air flow to the intake air path via a separate unit (such as a fan). For example, presently disclosed solutions may require less space than a separate fan or other separate system to add intake air flow. In addition, in the case of the electrical motor driving the shaft 115, if the turbocharger 112 is producing more air than is needed by the engine, the electric motor can also be used as a brake on the turning of the shaft 115 in order to recapture energy to the battery 134.

Figure 2:
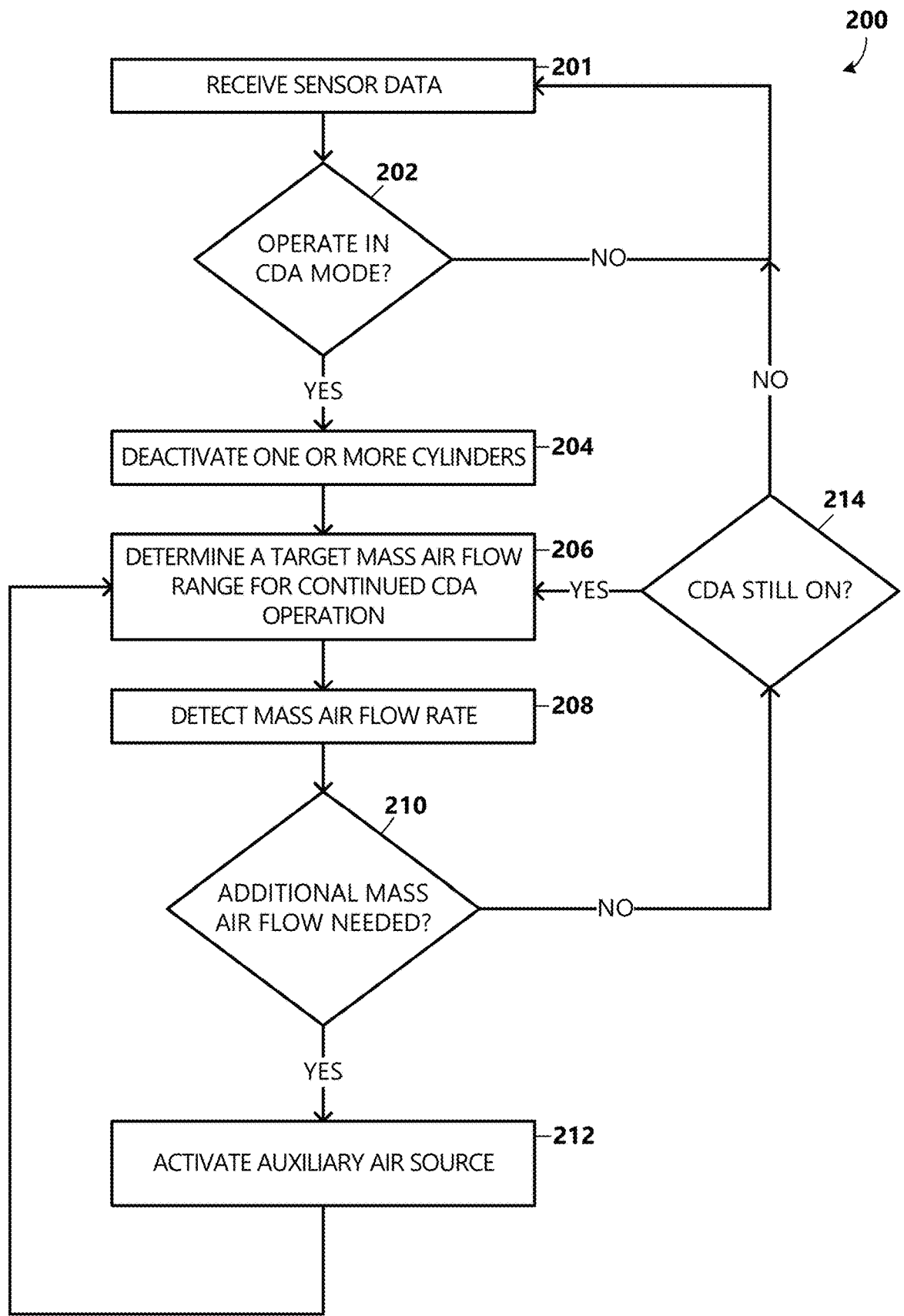
FIG. 2 is a flow diagram illustrating example processing steps of a method that can be used to extend the operating range of CDA using the auxiliary air source according to an example.

With reference now to FIG. 2, a flow diagram is provided illustrating processing steps of an example method 200 that can be used to providing additional airflow to a diesel engine 102. At operation 201, various sensor data may be received. For example, the ECU 110 may receive signals from various vehicle sensors 130, such as one or more mass air flow sensors, exhaust gas temperature sensors, engine speed sensors, air density sensors, and/or other sensors 130.

At decision operation 202, a determination may be made as to whether to operate the diesel engine 102 in CDA mode, where one or more of the cylinders 104 of the engine 102 may be deactivated. For instance, the ECU 110 may evaluate one or a combination of received signals to determine whether deactivating one or more cylinders 104 may cause the engine 102 to support a desired/requested amount of engine torque output and operate within a desired/acceptable range. The range, for example, may correspond with an efficiency threshold range in which soot formation is at an acceptable level and all emissions levels are legally compliant. In some examples, the determination to activate CDA, and/or to the extent to which cylinders 104 are deactivated, may be based at least in part on an energy cost calculation as it relates to increasing the temperature of the exhaust gases. For instance, based on the evaluation, a determination may be made that the engine 102 is producing exhaust gas temperatures that are too low for suitable EAS 118 operation (e.g., too low for sufficient heating of diesel oxidation catalyst(s) and/or catalyst(s) in a selective catalytic reduction (SCR) system). For example, the EAS 118 may include one or more diesel oxidation catalyst(s) and/or SCR catalyst(s) that need to be heated to sufficient temperature(s) in order to make emissions compliant with applicable regulations. Thus, in some examples, CDA may be used to increase the temperature of the exhaust gases. Or, in other examples, if the vehicle 100 is so equipped, a burner, an electrically heated catalyst (EHC) system, or other mechanism by which to input energy into the catalyst(s) may be used to increase the temperature of the exhaust gases. Under some conditions, it may be more advantageous to directly heat the catalyst(s) (e.g., using an EHC) than to activate CDA, because activating CDA may require also activating the auxiliary air source 111. In examples, a determination whether to activate CDA may be based on a balancing of the energy required to activate CDA versus other mechanisms for heating the catalyst(s).

In some examples, when a determination is made at decision operation 202 not to operate in CDA mode, the method 200 may return to operation 201, where sensor data may continue to be received and monitored. When a determination is made to activate CDA at decision operation 202, one or more cylinders 104 may be deactivated at operation 204. As discussed, the number of cylinders to be deactivated may vary, depending on engine speed, load, detected exhaust and/or catalyst temperature, etc. For example, the one or more cylinders 104 may be deactivated based on the determination to activate CDA and determination of the number of cylinders 104 to be deactivated.

At operation 206, a target mass air flow range for continued CDA operation may be determined. For example, the target mass air flow range may correspond to a range of AFRs that provide a desired/requested amount of engine torque output, while producing exhaust gas within a desired exhaust temperature range.

At operation 208, various signals from various sensors 130 may continue to be received and monitored. For example, at operation 208, the mass air flow rate may be detected by one or more sensors 130.

At decision operation 210, a determination may be made as to whether additional mass air flow may be needed to continue to operate CDA within the defined efficiency range (e.g., a combustion efficiency and/or fuel economy range). For example, as described above, at low engine speeds and at low engine loads, the measured/detected mass air flow rate may cause the AFR to be below a lower AFR threshold limit ($AFR_{l(-)}$) of the target mass air flow range. In some examples, at decision operation 210, a determination may be made by the ECU 110 that the mass flow rate of air ($\dot{m}$) supplied to the engine 102 causes the AFR to be below the AFR threshold limit ($AFR_{l(-)}$), and therefore indicative of a low AFR state. Accordingly, in some examples, at decision operation 210, the ECU 110 may determine that additional mass air flow ($\dot{m}_{add}$) is needed for operating CDA within the defined efficiency range. An example equation that can be used to determine an amount of additional mass air flow ($\dot{m}_{add}$) that may be needed is $$\dot{m}_{add} = (AFR_l \times F) - \left(aD \times \frac{n}{60} \times VE \times \rho_{air}\right).$$

When additional mass air flow is needed, at operation 212, the auxiliary air source 111 may be activated to provide the additional mass air flow ($\dot{m}_{add}$). In some examples, the ECU 110 may transmit a signal to the auxiliary air source 111 to cause the auxiliary air source 111 to engage the battery 134 for spinning the turbocharger shaft 115 for assisting the turbocharger 112 to supply the needed additional mass air flow ($\dot{m}_{add}$) to the engine 102 to operate CDA within the defined efficiency range. In other examples, the ECU 110 may transmit a signal to the auxiliary air source 111 instructing the auxiliary air source 111 to mechanically engage the crankshaft 124 for spinning the turbocharger shaft 115 for assisting the turbocharger 112 to supply the needed additional mass air flow ($\dot{m}_{add}$) to the engine 102 to operate CDA within the defined efficiency range. In other examples, other means may be used to activate the auxiliary air source 111.

The method 200 may return to operation 206, where an updated target mass air flow range for continued CDA operation may be determined based on a current requested engine load and the exhaust temperature range. In some examples, at decision operation 210, a determination may be made that additional mass air flow ($\dot{m}_{add}$) to the engine 102 is not needed. For example, a determination may be made that the AFR corresponding to the measured mass air flow is within the AFR range for providing the desired/requested amount of engine torque output, while producing exhaust gas within the exhaust temperature range. Thus, less or no additional mass air flow ($\dot{m}_{add}$) may be needed. For instance, in some examples, the auxiliary air source 111 may be reduced or disengaged. For example, the turbocharger 112 may be able to generate sufficient mass air flow ($\dot{m}$) using either only exhaust gas from the engine 102 or less power from the auxiliary air source 111. In some examples, the ECU 110 may transmit a signal to the auxiliary air source 111 instructing the auxiliary air source 111 to reduce an amount of torque on the turbocharger shaft 115. In other examples, the ECU 110 may transmit a signal to the auxiliary air source 111 instructing the auxiliary air source 111 to mechanically disengage from the crankshaft 124.

When additional mas air flow ($\dot{m}$) is not needed, the method 200 may proceed to decision operation 214, where a determination may be made as to whether CDA is still on. When CDA mode is still active, the method 200 may then return to operation 206, where an updated target mass air flow range for continued CDA operation may be determined based on a current requested engine load and the exhaust temperature range. When CDA mode is not active at decision operation 214, the method 200 may return to operation 201, where various sensor 130 signals may continue to be received and used to determine (e.g., at operation 202) whether to turn CDA mode on again.

Figure 3:
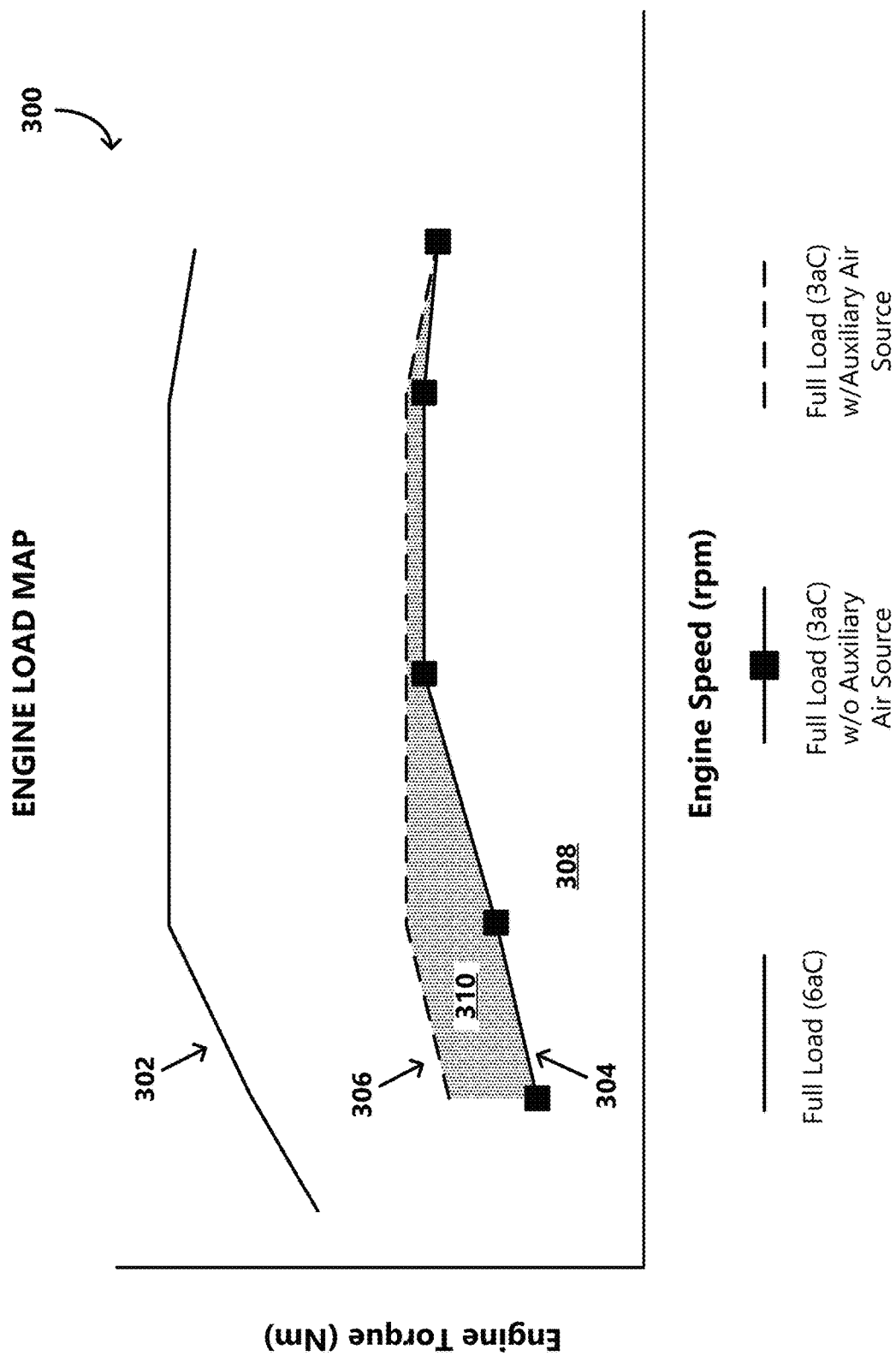
FIG. 3 is a graphical representation of an example engine load map illustrating how using the auxiliary air source can expand the operating range of CDA.

FIG. 3 is a graphical representation showing an example engine load map 300 illustrating how the auxiliary air source 111 can expand the usable range of CDA. The example engine load map 300 shows engine torque as a function of engine speed for a 6-cylinder engine 102 under baseline (6 cylinders 104 firing) (first line 302), CDA operation (3 cylinders 104 firing) without using the auxiliary air source 111 (second line 304), and CDA operation (3 cylinders 104 firing) using the auxiliary air source 111 (third line 306). For example, FIG. 3 shows CDA operation for three cylinders 104 firing (which may be referred to herein as 3 active cylinders or "3aC"), but the number of active cylinders 104 is not limited to 3, and is instead an additional variable that can be used to adjust the AFR. As shown, there are two basic regions of operation, a first region 308 representing an area of CDA operation range without the auxiliary air source 111, and a second region 310 representing an area of expanded CDA operation range by using the auxiliary air source 111. For instance, the second line 304 depicts CDA performance that is limited by insufficient intake combustion air flow. By using the auxiliary air source 111 to assist the turbocharger 112 to increase the intake combustion air flow and, therefore, the AFR, the CDA performance may be extended to the third line 306.

As an example, for an example engine 102, CDA operation using the auxiliary air source 111 may cause the engine torque output to be approximately 900 Nm when the engine speed is approximately 750 rpm, in comparison with an engine torque output of approximately 500 Nm without use of the auxiliary air source 111. For instance, without use of the auxiliary air source 111, the engine torque output may be limited by an AFR of approximately 17:1. As another example, CDA operation using the auxiliary air source 111 may cause the engine torque output to be approximately 1200 Nm when the engine speed is approximately 900 rpm, in comparison with an engine torque output of approximately 700 Nm without use of the auxiliary air source 111. In some examples, in addition to expanding the CDA operating range, using the auxiliary air source 111 may further increase fuel economy and engine out exhaust gas temperatures. As can be appreciated, increased exhaust gas temperatures can increase efficiency of the EAS 118.

Figure 4:
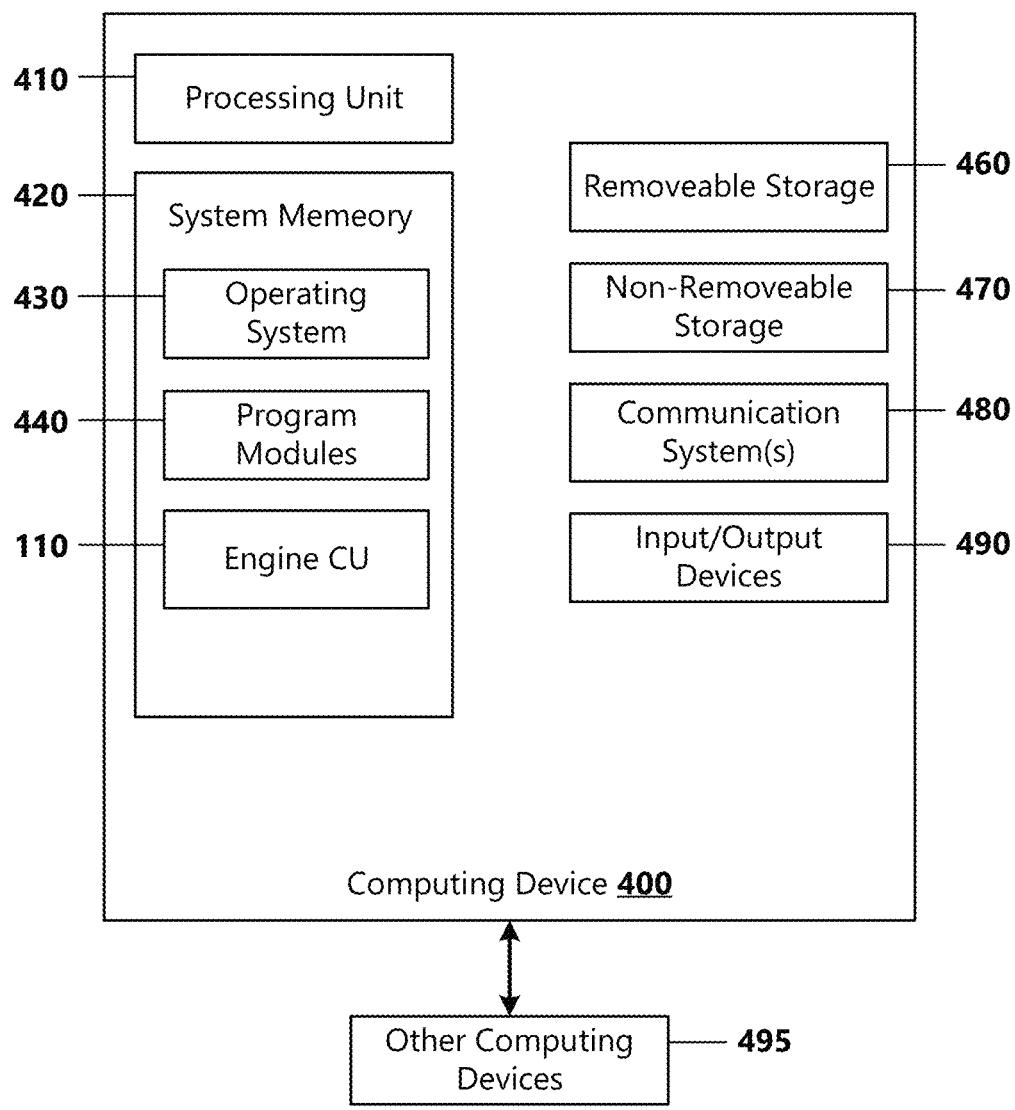
FIG. 4 is a block diagram illustrating example physical components of a computing device or system with which examples may be practiced.

FIG. 4 is a block diagram illustrating physical components of an example computing device with which aspects may be practiced. The computing device 400 may include at least one processing unit 402 and a system memory 404. The system memory 404 may comprise, but is not limited to, volatile (e.g. random access memory (RAM)), non-volatile (e.g. read-only memory (ROM)), flash memory, or any combination thereof. System memory 404 may include operating system 406, one or more program instructions 408, and may include sufficient computer-executable instructions for the ECU 110, which when executed, perform functionalities as described herein. Operating system 406, for example, may be suitable for controlling the operation of computing device 400. Furthermore, aspects may be practiced in conjunction with a graphics library, other operating systems, or any other application program and is not limited to any particular application or system. This basic configuration is illustrated by those components within a dashed line 410. Computing device 400 may also include one or more input device(s) 412 (keyboard, mouse, pen, touch input device, etc.) and one or more output device(s) 414 (e.g., display, speakers, a printer, etc.).

The computing device 400 may also include additional data storage devices (removable or non-removable) such as, for example, magnetic disks, optical disks, or tape. Such additional storage is illustrated by a removable storage 416 and a non-removable storage 418. Computing device 400 may also contain a communication connection 420 that may allow computing device 400 to communicate with other computing devices 422, such as over a network in a distributed computing environment, for example, an intranet or the Internet. Communication connection 420 is one example of a communication medium, via which computer-readable transmission media (i.e., signals) may be propagated.

Programming modules may include routines, programs, components, data structures, and other types of structures that may perform particular tasks or that may implement particular abstract data types. Moreover, aspects may be practiced with other computer system configurations, including hand-held devices, multiprocessor systems, microprocessor-based or programmable user electronics, minicomputers, mainframe computers, and the like. Aspects may also be practiced in distributed computing environments where tasks are performed by remote processing devices that are linked through a communications network. In a distributed computing environment, programming modules may be located in both local and remote memory storage devices.

Furthermore, aspects may be practiced in an electrical circuit comprising discrete electronic elements, packaged or integrated electronic chips containing logic gates, a circuit using a microprocessor, or on a single chip containing electronic elements or microprocessors (e.g., a system-on-a-chip (SoC)). Aspects may also be practiced using other technologies capable of performing logical operations such as, for example, AND, OR, and NOT, including, but not limited to, mechanical, optical, fluidic, and quantum technologies. In addition, aspects may be practiced within a general purpose computer or in any other circuits or systems.

Aspects may be implemented as a computer process (method), a computing system, or as an article of manufacture, such as a computer program product or computer-readable storage medium. The computer program product may be a computer storage medium readable by a computer system and encoding a computer program of instructions for executing a computer process. Accordingly, hardware or software (including firmware, resident software, microcode, etc.) may provide aspects discussed herein. Aspects may take the form of a computer program product on a computer-usable or computer-readable storage medium having computer-usable or computer-readable program code embodied in the medium for use by, or in connection with, an instruction execution system.

Although aspects have been described as being associated with data stored in memory and other storage mediums, data can also be stored on or read from other types of computer-readable media, such as secondary storage devices, like hard disks, floppy disks, flash drives, or a CD-ROM, or other forms of RAM or ROM. The term computer-readable storage medium refers only to devices and articles of manufacture that store data or computer-executable instructions readable by a computing device. The term computer-readable storage media does not include computer-readable transmission media.

Aspects of the present invention may be used in various distributed computing environments where tasks are performed by remote processing devices that are linked through a communications network.

Aspects of the invention may be implemented via local and remote computing and data storage systems. Such memory storage and processing units may be implemented in a computing device. Any suitable combination of hardware, software, or firmware may be used to implement the memory storage and processing unit. For example, the memory storage and processing unit may be implemented with computing device 400 or any other computing devices 422, in combination with computing device 400, wherein functionality may be brought together over a network in a distributed computing environment, for example, an intranet or the Internet, to perform the functions as described herein. The systems, devices, and processors described herein are provided as examples; however, other systems, devices, and processors may comprise the aforementioned memory storage and processing unit, consistent with the described aspects.

The description and illustration of one or more aspects provided in this application are intended to provide a thorough and complete disclosure of the full scope of the subject matter to those skilled in the art and are not intended to limit or restrict the scope of the invention as claimed in any way. The aspects, examples, and details provided in this application are considered sufficient to convey possession and enable those skilled in the art to practice the best mode of the claimed invention. Descriptions of structures, resources, operations, and acts considered well-known to those skilled in the art may be brief or omitted to avoid obscuring lesser known or unique aspects of the subject matter of this application. The claimed invention should not be construed as being limited to any embodiment, aspects, example, or detail provided in this application unless expressly stated herein. Regardless of whether shown or described collectively or separately, the various features (both structural and methodological) are intended to be selectively included or omitted to produce an embodiment with a particular set of features. Further, any or all of the functions and acts shown or described may be performed in any order or concurrently. Having been provided with the description and illustration of the present application, one skilled in the art may envision variations, modifications, and alternate embodiments falling within the spirit of the broader aspects of the general inventive concept provided in this application that do not depart from the broader scope of the present disclosure.

We claim:

1. A method for extending an operating range of cylinder deactivation (CDA) mode of a diesel engine of a vehicle, comprising:
   determining a first energy cost associated with activating an auxiliary air source for the CDA mode using the auxiliary air source;
   determining a second energy cost associated with directly heating a catalyst;
   determining that the first energy cost is less than the second energy cost;
   determining, based at least in part on determining that the first energy cost is less than the second energy cost, to activate the CDA mode;
   sending at least one signal to deactivate at least one of a plurality of cylinders of the diesel engine;
   determining a target mass air flow range of intake air to the diesel engine that allows for continued CDA mode operation within an efficiency operating range;
   determining a mass air flow rate of the diesel engine; and
   when the mass air flow rate is determined to be below the target mass air flow range, sending at least one signal to cause the auxiliary air source to increase the mass air flow rate to reach at least the target mass air flow range.

2. The method of claim 1, wherein sending the at least one signal to cause the auxiliary air source to increase the mass air flow rate to reach at least the target mass air flow range comprises causing the auxiliary air source to draw power from a battery to drive an electric motor of the auxiliary air source to add torque to a shaft.

3. The method of claim 2, further comprising:
   determining, after sending the signal, that the mass air flow rate is above the target mass air flow range causing the auxiliary air source to recapture energy to the battery by causing an electric motor of a turbocharger to act as a brake on rotation of the shaft.

4. The method of claim 1, wherein sending the at least one signal to cause the auxiliary air source to increase the mass air flow rate to reach at least the target mass air flow range comprises causing the auxiliary air source to mechanically engage a crankshaft of the vehicle to add torque to a shaft.

5. The method of claim 1, wherein determining the target mass air flow range comprises determining the target mass air flow range based at least in part on a range of air-to-fuel ratios that produce an exhaust gas within an exhaust gas temperature range.

6. The method of claim 5, wherein determining a first energy cost associated with activating an auxiliary air source for the continued CDA mode includes production of the exhaust gas within the exhaust gas temperature range.

7. The method of claim 1, further comprising:
   determining, after sending the signal, that the mass air flow rate is above the target mass air flow range; and
   sending at least one signal to cause the auxiliary air source to deactivate.

8. The method of claim 1, wherein determining the target mass air flow range comprises:
   detecting an engine speed of the diesel engine; and
   determining the target mass air flow range based at least in part on a range of air-to-fuel ratios that provide a requested engine load at the detected engine speed.

9. The method of claim 8, wherein load of the diesel engine is above a low load condition.

10. The method of claim 9, wherein speed of the diesel engine is a low engine speed condition.

11. A vehicle including:
    a diesel engine including a plurality of cylinders; and
    an engine control unit, comprising:
       at least one processor; and
       memory coupled to the at least one processor including instructions that, when executed by the at least one processor, cause the engine control unit to:
          determine a first energy cost associated with activating an auxiliary air source for a cylinder deactivation (CDA) mode using the auxiliary air source;
          determine a second energy cost associated with directly heating a catalyst;
          determine that the first energy cost is less than the second energy cost;
          determine, based at least in part on determining that the first energy cost is less than the second energy cost, to activate the CDA mode;
          send at least one signal to deactivate at least one of the plurality of cylinders of the diesel engine;

determine a target mass air flow range of intake air to the diesel engine that allows for continued CDA mode operation within an efficiency operating range;

determine a mass air flow rate of the diesel engine; and when the mass air flow rate is determined to be below the target mass air flow range, sending at least one signal to cause the auxiliary air source to increase the mass air flow rate to reach at least the target mass air flow range.

12. The vehicle of claim 11, wherein:
the vehicle further comprises a battery; and
the auxiliary air source is powered by the battery.

13. The vehicle of claim 12, wherein the instructions further cause the engine control unit to:
when the mass air flow rate is determined to be above the target mass air flow range, send at least one signal to cause the auxiliary air source to recapture energy to the battery by causing an electric motor of a turbocharger to act as a brake on rotation of a shaft, wherein operations of the turbocharger include receiving exhaust gas from the diesel engine and supply charged intake air to the diesel engine, the turbocharger including an auxiliary air source.

14. The vehicle of claim 11, wherein:
the vehicle further comprises a crankshaft; and
the auxiliary air source is powered by mechanical engagement with the crankshaft.

15. The vehicle of claim 11, wherein in determining the target mass air flow range, the instructions cause the engine control unit to determine the target mass air flow range based at least in part on a range of air-to-fuel ratios that produce exhaust gas within an exhaust gas temperature range.

16. The vehicle of claim 15, wherein in determining the first energy cost associated with activating the auxiliary air source for continued CDA mode operation includes production of exhaust gas within the exhaust gas temperature range.

17. The vehicle of claim 11, wherein in determining the target mass air flow range, the instructions cause the engine control unit to:
detect an engine speed of the diesel engine; and
determine the target mass air flow range based at least in part on a range of air-to-fuel ratios that provide a requested engine load at the detected engine speed.

18. The vehicle of claim 17, wherein:
load of the diesel engine is above a low load condition; and
speed of the diesel engine is a low engine speed condition.

19. A system for extending an operating range of cylinder deactivation (CDA) mode, comprising:
at least one processor; and
memory coupled to the at least one processor including instructions that, when executed by the at least one processor, cause the system to:
determining a first energy cost associated with activating an auxiliary air source for a CDA mode using the auxiliary air source;
determining a second energy cost associated with directly heating a catalyst;
determining that the first energy cost is less than the second energy cost;
determining, based at least in part on determining that the first energy cost is less than the second energy cost, to activate the CDA mode;
sending at least one signal to deactivate at least one of a plurality of cylinders of a diesel engine;
determining a target mass air flow range of intake air to the diesel engine that allows for continued CDA mode operation within an efficiency operating range;
determining a mass air flow rate of the diesel engine; and
when the mass air flow rate is determined to be below the target mass air flow range, sending at least one signal to cause the auxiliary air source to increase the mass air flow rate to reach at least the target mass air flow range.

20. The system of claim 19, wherein the instructions further cause the system to:
determine the target mass air flow range based at least in part on a range of air-to-fuel ratios that produce exhaust gas within an exhaust gas temperature range; and
determine to activate the CDA mode to produce exhaust gas within the exhaust gas temperature range.

* * * * *